W. E. VAN SCHAICK.
Sleigh.
No. 96,169. 
Patented Oct. 26, 1869.
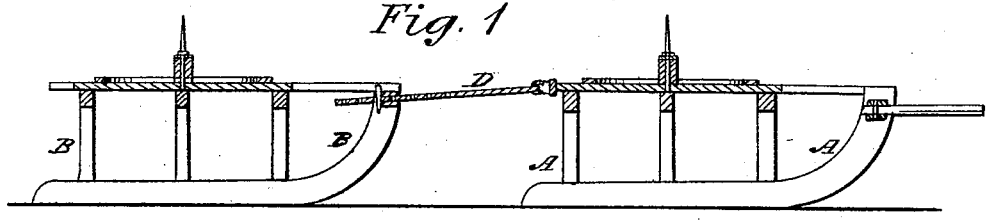
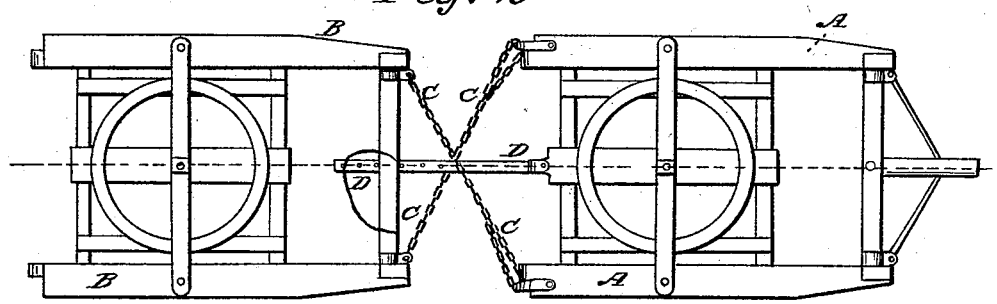
Witnesses:
Inventor:

United States Patent Office.

WILLIAM E. VAN SCHAICK, OF DELAVAN, WISCONSIN.

Letters Patent No. 96,169, dated October 26, 1869.

---

IMPROVEMENT IN SLEIGH-COUPLINGS.

---

The Schedule referred to in these Letters Patent and making part of the same

---

*To all whom it may concern:*

Be it known that I, WILLIAM E. VAN SCHAICK, of Delavan, in the county of Walworth, and State of Wisconsin, have invented a new and useful Improvement in Bob-Sleigh Coupling; and I do hereby declare that the following is a full, clear, and exact description thereof, which will enable others skilled in the art to make and use the same, reference being had to the accompanying drawings, forming part of this specification, in which—

Figure 1 is a vertical longitudinal section of a pair of bobs, connected by my improved coupling, taken through the line x x, fig. 2.

Figure 2 is a top or plan view of the same.

Similar letters of reference indicate corresponding parts.

My invention has for its object to furnish an improved coupling for connecting the front and rear bobs of a bob-sleigh to each other, which shall be simple in construction, and effective in operation, enabling the movement of the rear bob to be fully controlled or guided by the movement of the forward one; and It consists in the crossed-chain connection, and in the swivelled reach, as hereinafter more fully described.

A represents the forward bob, and B, the rear one, about the construction of which there is nothing new, except that the rear bob is required to have a pivoted bolster, in the same manner as the front one.

C are chains, the forward ends of which are attached to the rear end of the forward bob A.

The chains C cross each other, and their rear ends are attached to the ends of the roller of the rear bob B.

The chains C should be adjustable, so that the bobs may be adjusted nearer together, or further apart, as may be desired.

D is the reach, the forward end of which is swivelled to the middle part of the rear end of the forward bob A, and the rear part of which passes through a hole in the centre of the roller of the rear bob B.

Several holes are formed in the rear part of the reach D, through one or the other of which, according to the distance apart of the bobs A B, is passed a pin, in front of the roller of the rear bob, to prevent the bobs from ever getting too close together.

By this construction, the crossed chains cause the forward end of the rear bob, in turning, to turn outward, so that it will follow the curved track of the forward bob, and thus, by counterbalancing the "swing" of the sleigh, prevent the sleigh from being overturned. It also guards against breakage, should one or both bobs be overturned.

Having thus described my invention,

I claim as new, and desire to secure by Letters Patent—

The combination of the roller on the front of rear bob with adjustable chains, adjustable reach, swivelled at each end, and connecting-staples on front bob, as and for the purpose specified.

WM. E. VAN SCHAICK.

Witnesses:
NEWTON McGRAW,
JOHN S. McDOUGALL.